UNITED STATES PATENT OFFICE.

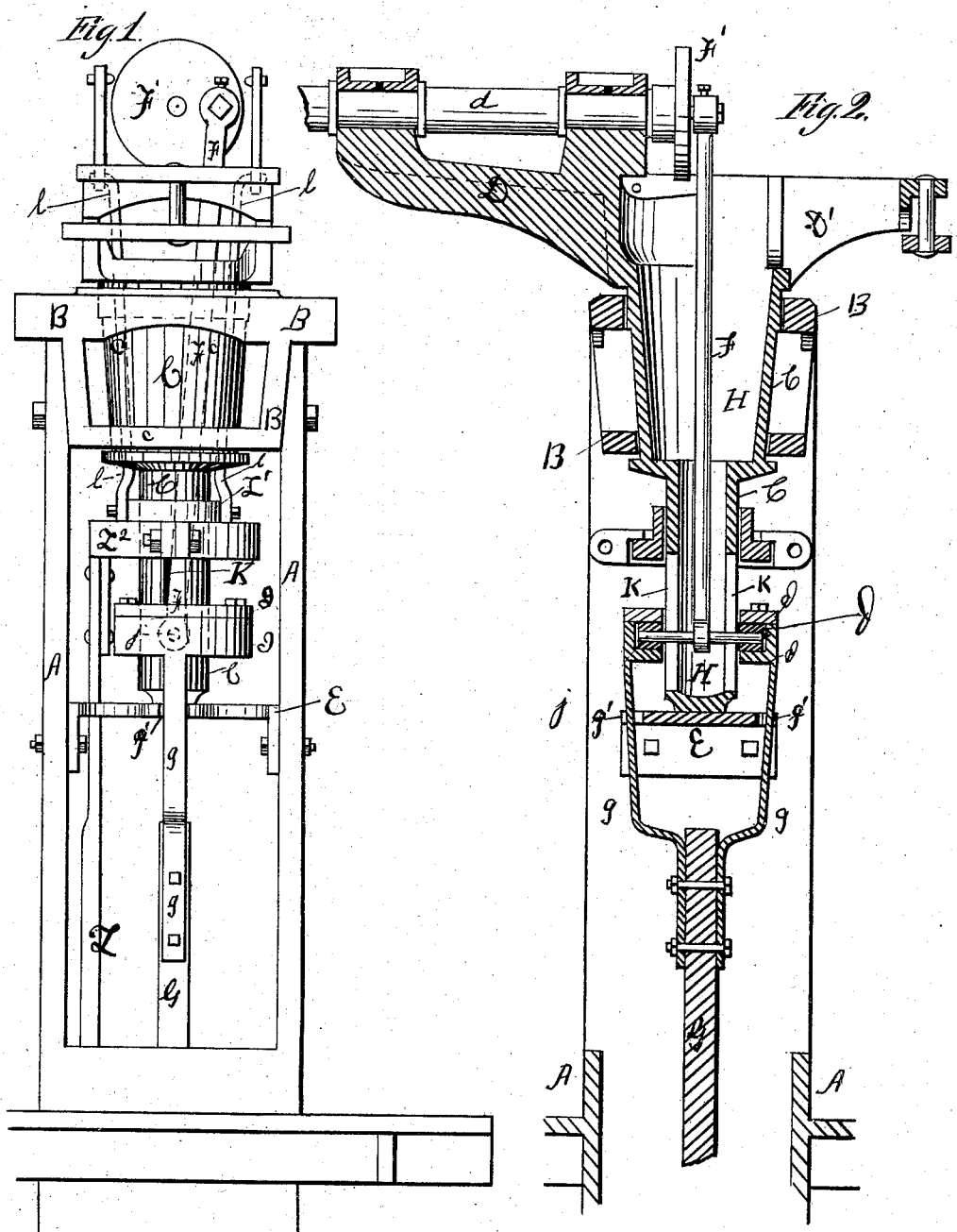

WILLIAM D. NICHOLS, OF BATAVIA, ILLINOIS.

WINDMILL.

SPECIFICATION forming part of Letters Patent No. 240,607, dated April 26, 1881.

Application filed August 16, 1880. (No model.)

*To all whom it may concern:*

Be it known that I, WILLIAM D. NICHOLS, of Batavia, in the county of Kane and State of Illinois, have invented certain new and useful Improvements in Windmills, of which the following is a specification.

My invention relates to improvements in the method of mounting windmills, the object being to lessen the friction and secure a smooth and easy movement of the parts, so that the apparatus will readily adjust itself to the direction of the wind; and my invention consists in balancing and supporting the windmill on a center or a pivotal bearing, and in connection therewith the mechanism hereinafter described for communicating the reciprocating motion of the pitman to the pump-rod.

In the accompanying drawings, which form part of this specification, Figure 1 is a back elevation of a windmill provided with my improvements, and Fig. 2 is a vertical central section of the same on a plane at right angles to the plane of the back.

Similar letters of reference indicate like parts wherever used in each of the figures of said drawings.

In the drawings, A represents the top portion of the tower or frame upon which the windmill is supported.

B is the top supporting casting or bearing for the rotating carriage C of the windmill. It is secured firmly by bolts or otherwise to the frame A. The rotating carriage is preferably cast in one piece, and it consists of a hollow shaft provided at its upper extremity with an arm, D, upon which the shaft $d$ of the wind-wheel is journaled, and an opposite arm, D', to which the counterpoise-weight is secured. The lower end of the hollow shaft or rotating carriage C is made solid, or provided with a flat bottom, to give a better pivotal bearing upon the bridge or flat plate E, upon which the whole weight of the windmill rests as a center or pivot, and upon which the whole is balanced by means of the counterpoise-weight; but neither the counterpoise nor the wind-wheel is shown in the drawings. They may be of any ordinary construction. By thus balancing and supporting the weight of the whole rotating mechanism upon a center or pivot instead of upon an ordinary turn-table, the same rotates or turns with the greatest ease, and will consequently quickly and delicately adjust itself to the direction of the wind, however slight its force may be.

The bridge E is secured firmly to the frame A in any suitable manner.

The post $c$ of the hollow shaft or rotating carriage C, which fits and turns in the casting or bearing B, is made large and conical in form, in order to give firmness and stability and prevent any tendency to vibration.

The pitman F, secured at one end to the pitman-plate F', reciprocates up and down in the chamber H of the hollow rotating carriage C, and its reciprocating motion is communicated to the pump-rod G by means of the straps or rods $g\ g$, which are secured at their lower ends to the pump-rod and at their upper ends to the swivel or rings I, which clasp the collar J. A pin, $j$, passes through the lower end of the pitman F and into the collar J, thus connecting the two together.

The lower part, $c'$, of the hollow shaft or rotating carriage C is made cylindrical in form, so that the collar J and swivel or rings I may work up and down on the same, and is provided with slots K, in which the pin $j$ works up and down with the pitman.

The straps $g\ g$ fit in notches $g'$ cut in the sides of the bridge E, to prevent any tendency to turn or twist the pump-rod. When the hollow shaft or rotating carriage C turns the collar J turns with it; but the straps $g$ and swivel or rings I remain stationary.

L is the rod connecting with the lever by which the vanes of the wind-wheel are folded or unfolded, or their inclination changed or controlled. It is connected with the vane-controlling mechanism of the wind-wheel by means of the ridged collar L' and grooved clasp-ring $L^2$, connecting with the rods $l$, which pass up through the hollow shaft or rotating carriage C.

The operation is as follows: The whole rotating mechanism of the mill is supported, balanced, and turns upon the bridge E as a center or pivot, thus accommodating itself with great freedom and ease to the direction of the wind, and by means of the connecting mechanism described the motion of the pitman is communicated to the pump-rod without causing the least wrenching or disturbance or irregularity in the motion of the same by reason of the rotation of the hollow shaft C.

What I claim is—

1. The rotating carriage of the windmill, terminating in a closed end or pivotal point at its bottom, in combination with the plate E, upon which the rotating carriage turns and is balanced and supported, substantially as specified.

2. In a windmill, the hollow rotating carriage C, terminating in a closed end at its bottom, and provided with arms D and D' for the wind-wheel, and the counterpoise, in combination with supporting-plate E, upon which the whole rests and turns as a central pivot, substantially as specified.

3. The combination of hollow rotating carriage C, terminating at its bottom in a solid or closed end, supporting-plate E, the pitman F, and pump-rod G, and mechanism whereby the reciprocating motion of the pitman is communicated to the pump-rod, substantially as described.

4. The combination of the hollow rotating carriage C, supported and turning upon a pivot, and provided with slots K, pitman F, pin $j$, collar J, swivel or rings I, straps $g$, and pump-rod G, substantially as specified.

5. In a windmill, the hollow rotating slotted carriage, terminating at its bottom in a pivotal point, in combination with the reciprocating pitman inside thereof and rings working on the outside thereof, to which the pump-rod is attached, substantially as specified.

WILLIAM D. NICHOLS.

Witnesses:
BENJAMIN DANFORTH,
JOHN G. MOLE.